United States Patent
Judkins et al.

(10) Patent No.: US 7,779,881 B2
(45) Date of Patent: Aug. 24, 2010

(54) MACHINE FOR MAKING COLLAPSIBLE CELLULAR STRUCTURE

(75) Inventors: Ren Judkins, 46 Newgate Rd., Pittsburgh, PA (US) 15202; John D. Rupel, Appleton, WI (US)

(73) Assignee: Ren Judkins, Pittsburgh, PA (US)

(*) Notice: Subject to any disclaimer, the term of this patent is extended or adjusted under 35 U.S.C. 154(b) by 864 days.

(21) Appl. No.: 10/558,518

(22) PCT Filed: May 27, 2004

(86) PCT No.: PCT/US2004/016698

§ 371 (c)(1),
(2), (4) Date: Nov. 28, 2005

(87) PCT Pub. No.: WO2004/106048

PCT Pub. Date: Dec. 9, 2004

(65) Prior Publication Data

US 2007/0044920 A1 Mar. 1, 2007

(51) Int. Cl.
*B32B 3/12* (2006.01)
(52) U.S. Cl. .......... 156/361; 156/461; 156/578; 156/510; 156/467
(58) Field of Classification Search .......... 156/291, 156/304.1, 304.3, 292
See application file for complete search history.

(56) References Cited

U.S. PATENT DOCUMENTS

| | | | |
|---|---|---|---|
| 3,963,549 A | | 6/1976 | Rasmussen |
| 4,123,569 A | * | 10/1978 | Peterson et al. ............. 427/141 |
| 4,450,027 A | | 5/1984 | Colson |
| 4,631,108 A | | 12/1986 | Colson |
| 4,732,630 A | | 3/1988 | Schnebly |
| 5,002,628 A | | 3/1991 | Schnebly |
| 5,188,160 A | * | 2/1993 | Jelic ..................... 160/84.02 |
| 5,441,592 A | | 8/1995 | Ruggles et al. |
| 5,603,368 A | | 2/1997 | Colson et al. |
| 5,670,008 A | * | 9/1997 | Ruggles ..................... 156/264 |
| 6,461,464 B1 | * | 10/2002 | Swiszcz ..................... 156/221 |

* cited by examiner

*Primary Examiner*—Richard Crispino
*Assistant Examiner*—Barbara J. Musser
(74) *Attorney, Agent, or Firm*—Buchanan Ingersoll & Rooney PC

(57) ABSTRACT

A machine for making collapsible cellular structures folds two fabric webs into a V-shape or C-shape, connects the webs together with strands of adhesive, applies glue lines and collects the webs on a wheel. A variable speed motor, a fabric drive system which enables glue to be applied when the fabric is not stretched and a lay-on wheel assembly with movable arm that directs the fabric onto the collector can be provided in the machine.

12 Claims, 5 Drawing Sheets

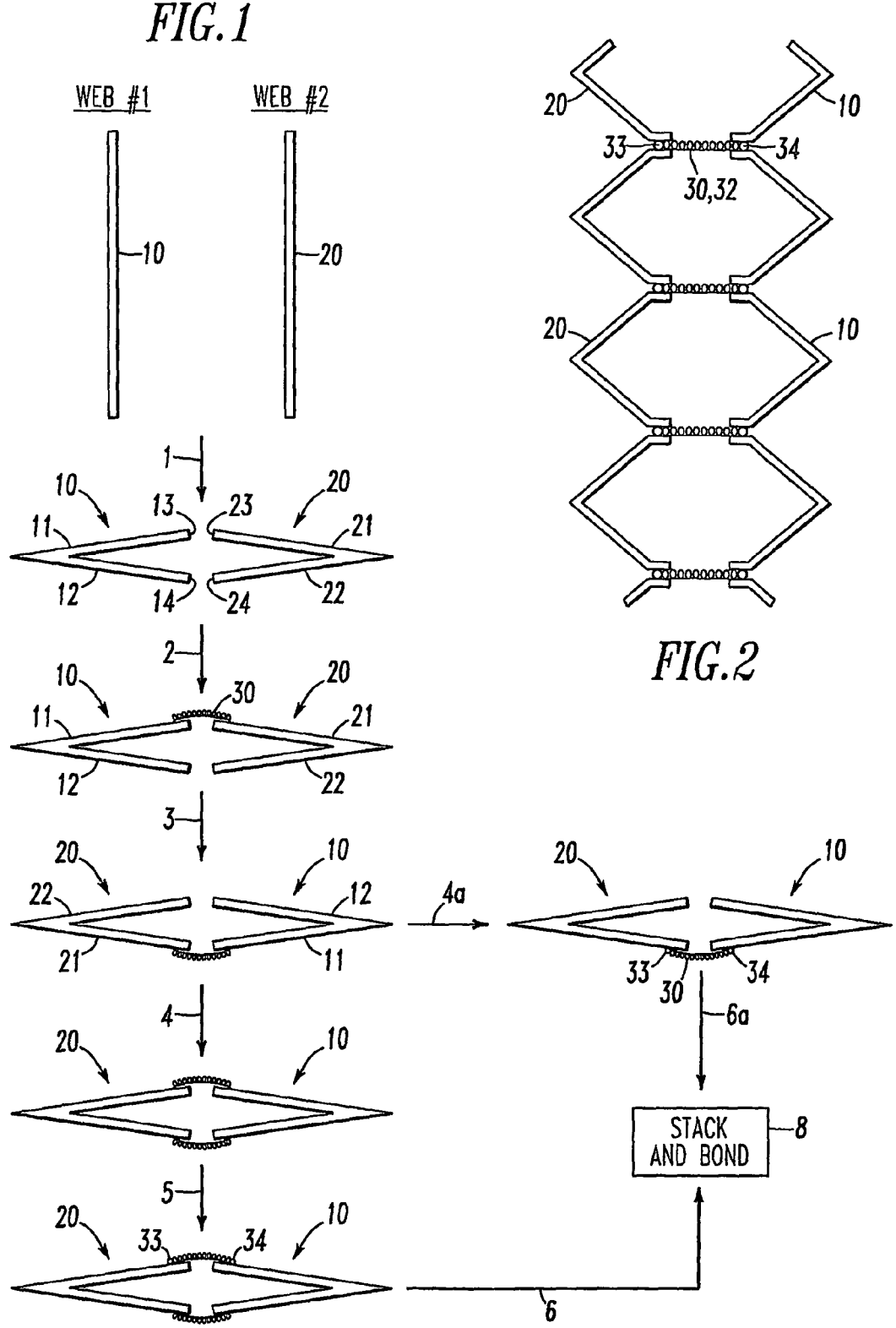

MACHINE FOR MAKING COLLAPSIBLE CELLULAR STRUCTURE

BACKGROUND OF THE INVENTION

1. Field of the Invention

This invention relates generally to machines that make collapsible cellular structures used as window coverings.

2. Description of the Prior Art

Cellular window coverings are well known in the art. These products have a series of interconnected cells usually made from fabric material. Typically, these products are made by folding and gluing sheets or strips of material to create a cellular structure or by connecting a series of webs between two parallel sheets.

One type of cellular window covering is constructed by folding over the edges of flat sheets of material and gluing the free edges to form a single cell, or multi-cellular structure, and then stacking and gluing several cellular structures on top of each other to form the cellular window covering. The assembled cells can then be cut to the width of the window in which it will be installed. Related U.S. Pat. Nos. 4,631,108 and 4,450,027 to Colson discloses a method and apparatus for fabricating expandable honeycomb insulation panels from a continuous length of thin plastic film. The film is folded into a tubular structure by folding opposite lateral edges of the film onto one side. An adhesive is applied to at least one side of this structure. Then the tubular structure is continuously wrapped around a rotating arm under constant tension in an effective, uniform manner that eliminates internal stresses that could otherwise cause warps or wrinkles. The tubular structure is continuously stacked in layers on a flat surface or a plurality of flat surfaces to eliminate any curves that might cause wrinkles or warps in the finished product. The apparatus includes an initial creaser assembly in which a pair of spaced-apart sharp wheels are pressed into the film to form uniform creases where the film material will be folded. It also includes a folding assembly to fold the lateral edges at the crease over the mid-portion thereof and a press assembly to mechanically crimp the folds. The apparatus contains a heat setting assembly for heating the plastic film material to a sufficiently high temperature so that it looses its elasticity and becomes sufficiently plastic to permanently set the folds therein. A drive assembly pulls the plastic film through the folding and heat setting assemblies, and a positive displacement pump feeds a liquid adhesive through an applicator for deposition onto the surface of the folded tubular plastic film. The pump is driven from the film drive assembly so that the rate of deposition of the adhesive material on the film is always in direct relation to the rate of speed in which the film moves through the apparatus in order to maintain uniform beads of adhesive for clean cut glue lines in the finished panel product. The apparatus also includes a rotatable stacking arm having two spaced apart flat surfaces connected by curved ends. A tension and speed control assembly maintains a constant tension of the film as it is stacked uniformly in layers on the rotating arm or stacking bed. After a sufficient amount of film is wrapped around the arm cuts are made through the stack to remove from the arm the cellular structure that has been formed.

A significant shortcoming of the method and apparatus disclosed by Colson is that only the cellular material that has been formed on the flat surfaces can be used for window covering products. This is so because the cells in the material stacked on the curved ends of the arm retain some of their curvature. If this material were attached to a headrail and hung in front of a window the curves in the cells would be quite noticeable and unattractive. Nevertheless, the process and machine disclosed by Colson continues to be used commercially. Those users simply scrap the material that is cut from the curved ends of the arm. It is quite common for 15% to 20% of the starting material cut from the ends of the rotating arm to be and scrapped in this process. Additional waste results from another limitation of this process. The stacks of material cut from the flat surfaces of the arm have a width not greater than the length of each flat surface. The height of the stack is limited by the distance between the ends of the arm and the factory floor when that end is at its lowest position. After the stacks are removed from the rotating arm they must be cut to provide a panel of cellular material having a width and length equal to the size of the shade being made. Often two or more panels can be cut from each stack. Yet, seldom is the entire stack used to make the desired panels. Twenty to twenty-five percent of a stack can be excess material that is scrapped. Consequently, 35% to 45% of the starting material used in the process and machine disclosed by Colson is wasted.

Another method and apparatus for making cellular products is disclosed by Rasmussen in U.S. Pat. No. 3,963,549. In this method material is wound around two spaced apart drums. Lines of an adhesive are applied to the material prior to being wound. As a result overlaying surfaces of the material are bonded together at the glue lines forming a cellular structure. After a desired amount of material has been collected the material is cut and removed from the apparatus. The results are similar to that produced by Colson. The structure created on the drums is curved and cannot be used for window covering products.

Another method for manufacturing honeycomb materials in which a continuous length of material is wrapped on a wheel is disclosed by Schnebly in U.S. Pat. No. 4,732,630. The continuous length of material is folded along opposite side portions thereof into a generally flat tubular form. Adhesive is then applied along the length of the continuous material by first heating the material, applying the adhesive in a liquid state to the heated material, and then cooling the material to solidify the adhesive. The folded tubular material with solidified adhesive lines thereon is then wound about a rack in such a manner that the tubular material is deposited in a plurality of continuous layers one on another with the lines of adhesive being disposed between adjacent layers. The wound layers are then radially cut and placed in a vertically aligned stack while they are removed from the rack. The vertically stacked layers are then heated to a temperature sufficient to activate the lines of adhesive and bond the layers together. Finally, the stacked tubular material is cooled to form a unitary stack of tubular, expandable honeycomb material. This process is time consuming and expensive because the material and adhesive must be heated twice. Another problem is that the material and adhesive expand and contract at different rates. Consequently, the cellular structure will be wrinkled with the amount of wrinkles being dependent upon the materials used and the placement of the adhesive. Less wrinkling will occur if the cells are symmetrical and the adhesive is along a longitudinal centerline of the cells. The process is not practical for making a tabbed cell.

A principal advantage of the methods and apparatus disclosed by Colson, Rasmussen and Schnebly is their production capacity. The machines can be operated at relatively high speeds such that the material is being wound at speeds of 500 to 1000 feet per minute. Thus, there is a need for a machine that can rapidly produce cellular products from tubular structures without high scrap rates. The process should be able to produce wrinkle-free cellular structures of all types of cells.

SUMMARY OF THE INVENTION

We provide a machine for mailing a honeycomb structure from an elongated tubular structure that is wound on a wheel or similar collector. At least one longitudinal line of adhesive, preferably a slow cure adhesive, is applied to the exterior surface of the elongated tubular material before that material is placed on the wheel. The elongated tubular structure is wrapped around the collector in a manner to cause the adhesive to be positioned between overlying surfaces of the elongated tubular material and to form a cellular structure on the collector. At least one transverse cut is made through the elongated tubular structure that has been wrapped around a collector. The honeycomb structure is removed from the collector and placed on a flat surface for storage or cutting. This may be done before the adhesive has fully cured. If a single cut is made to remove the cellular structure from the wheel, that structure will have a width corresponding to the circumference of the wheel. If the adhesive cures while the stack is on a flat surface any initial curvature in the stack will decrease as gravity causes the stack to flatten. Sufficient flattening should occur so that any material curvature in the stack is not noticeable.

We prefer to use a wheel or similar collector in which the curved surfaces have a radius of at least 16.5 feet or 5 meters. The resulting cellular structure will be about 100 feet wide and then can be cut along any selected lines through the stack into sections having a length equal to the width of the cellular shade being produced. The number of wraps on the collector will determine the length of each section.

It is not necessary that the wheel be perfectly circular. Indeed, in one present preferred embodiment we use a wheel having four flat sides 50 inches or 124 inches in length connected by curved corners having a radius of one foot.

Other objects and advantages of the invention will become apparent from a description of certain present preferred embodiments thereof shown in the drawings.

BRIEF DESCRIPTION OF THE DRAWINGS

FIG. 1 is a diagram illustrating how the cells of the present cellular structure are formed.

FIG. 2 is a side elevational view of a portion of a present preferred collapsible cellular structure in the open position.

DETAILED DESCRIPTION OF THE PREFERRED EMBODIMENTS

The present preferred embodiments of our machine create a cellular structure by winding tubular material onto a collector and gluing adjacent portions of the tubular material together. The tubular material is formed from two V-shaped or C-shaped strips in certain embodiments of our machine disclosed here. In other embodiments the machine does not have a portion that forms the tubular material. The tubular material is purchased by the machine owner or made at a location remote from the machine.

Figure 3:
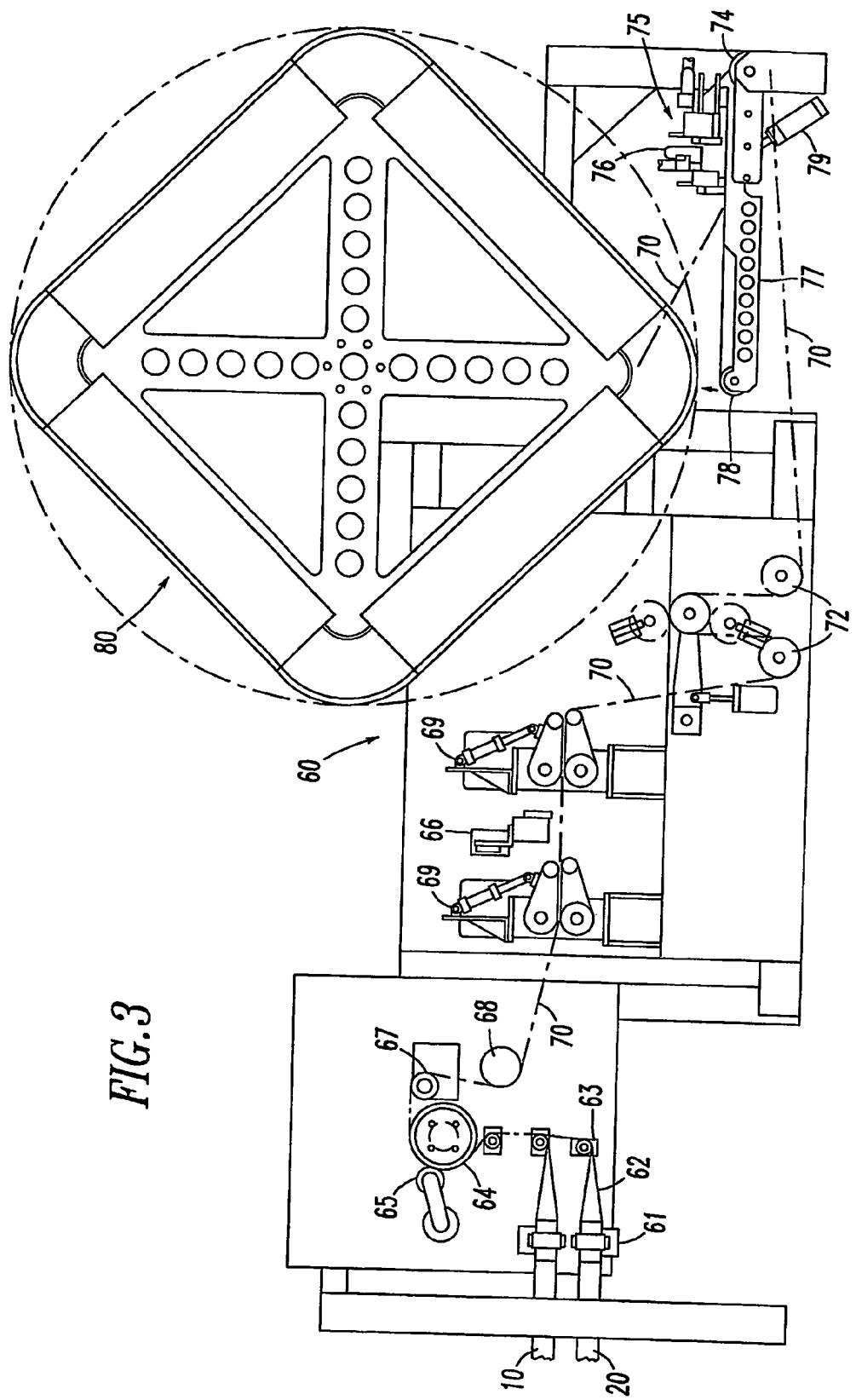
FIG. 3 is a side view of a present preferred machine for making the collapsible cellular structure.

In a first present preferred embodiment of our machine shown in FIG. 3, the tubular material is formed from two elongated strips or webs that are curved or folded and joined edge to edge by swirled strands. Referring to FIG. 1 there is shown an end view of two strips of material 10 and 20 labeled WEB #1 and WEB #2. The material may be any woven or non-woven fabric suitable for use as a window covering. There may also be some films that could be made into cellular structures in accordance with the present invention. As indicated by arrow number 1, each web 10 and 20 is folded into a V shape creating an upper wall 11 and 21 and a lower wall 12 and 22. The V-shape may be formed by impressing a permanent pleat in the fabric. Alternatively, the web could be C-shaped and have no pleat or the pleat could be soft allowing the fold to fall out while the cellular structure is hung from a headrail. This structure would thus have a Roman shade-like appearance. The webs 10 and 20 are positioned so that the edges 13 and 23 of the upper walls 11 and 21 are opposite one another. Similarly, the edges 14 and 24 of the lower walls 12 and 22 are opposite one another. When so positioned the edges 13 and 14 or 23 and 24 are in a plane that does not pass through any other portion of the web. That plane should be normal to a plane passing through the folds or pleats in the webs, but those planes could meet at an angle less than 90°. Next a series of swirled strands 30 below arrow 2 are applied between the edges 13 and 23 of the upper wall. The gap between edges 13 and 23 across which the strands 30 are placed is preferably wide enough such that at least one lift cord may be disposed through corresponding spaces between the strands 30. Preferably, the gap is not greater than one-fourth inch. The strands 30 may be applied through a heated reservoir so that the strands 30 are applied in a liquid or tacky solid state. The adhesive remains in this form until after it contacts the surface of the web. Being liquid or tacky, the adhesive will adhere to each surface it contacts. It is also possible to make the surface of the web which receives the strands reactive or tacky by applying a reactive material or a tacky material to that surface before applying the strands. If that surface is tacky or reactive then the strands need not be tacky. The strands 30 are placed upon and travel back and forth between the upper surfaces 11 and 21 of the webs 10 and 20 adhering to each. As a result, a plurality of strands 30 of flexible adhesive connects the webs of material 10 and 20 much like a spider web. The strands may or may not intersect. We prefer that the distance between any two adjacent stands be not more than one-eighth inch. The number of strands applied, their position and their thickness determine the thickness and density of the bridge of strands between the webs. There are now available air guns that can be used in combination with the adhesive feeder that forms the strands. These air guns enable a manufacturer to very accurately control the placement of the strands. The material used for the strands and the orifice in the extruder that forms the strands will determine the size of the strands. The webs 10 and 20 can be made of the same material or be different materials. The materials may differ in cost, opacity, thickness, method of manufacture, texture or in the way in which the material diffuses light.

After the bridge of swirled strands 30 has been applied the structure is flipped as indicated by arrow 3. The remaining steps follow arrows 4, 5 and 6 or 4a and 6a. In one process a second bridge of swirled strands 32 is applied between surfaces 12 and 22 of webs 10 and 20 forming a closed cell. The cells are joined together by an adhesive. The adhesive is applied in two beads 33 and 34 on the surfaces of the webs 10 and 20. The beads 33 and 34 are adjacent the bridge of swirled strands 30. Preferably, these beads extend over the swirled strands and help bond the strands 30 to the webs 10 and 20. Finally, the cells are stacked and bond together in the stack to form a cellular structure similar to that shown in FIG. 2. The cells could be made to be symmetrical like those in FIG. 2 or non-symmetrical.

An optional method indicated by arrows 4a and 6a in FIG. 1 applies only one bridge of swirled strands 30 and two beads of adhesive 33 and 34. Then this open cell structure is stacked and bonded as indicated at box 8. The only difference between the cellular structures formed by the two methods illustrated in FIG. 1 is that one structure will have a single bridge of swirled strands at the interface of adjacent cells and the second structure will have two bridges of swirled strands at that interface.

Figure 4:
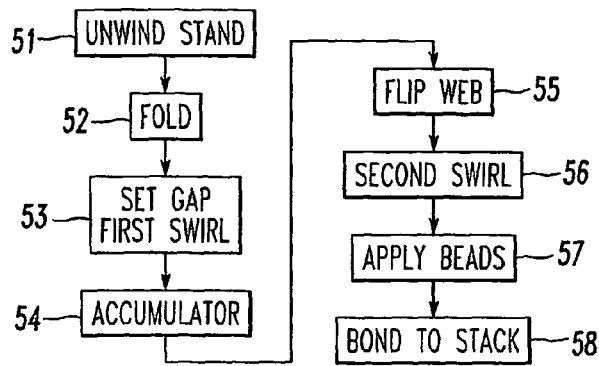
FIG. 4 is a block diagram of a present preferred method for forming the cellular structure using the machine shown in FIG. 3.

A first present preferred machine shown in FIG. 3 makes the cellular structure here disclosed in a fully automated process using the steps shown in FIG. 4. The material from which the front section and the rear section are made are rolls of selected fabric mounted on a stand (not shown). The first step indicated by box 51 in FIG. 4 is to unwind the fabric and direct it to the fabricating machine 60 shown in FIG. 3. As the webs enter the machine 60 they pass over an idler wheel 61 and into a V-shaped guide 62. As the web passes through this guide it is folded as indicated by box 52 in FIG. 4. The folded webs each pass between rollers 63 that may be heated to form a pleat. When the webs reach mandrel 64 they are oriented to have their free edges opposite one another as shown below arrow 1 in FIG. 1. There may be some variation in the width of the upper and lower surfaces of the webs as they enter the drum 64. Therefore, we prefer to provide a slitter 65 adjacent the mandrel 64 to trim the webs as they pass. This assures that the webs are always the same size. The slitter also assures that the gap between the two webs 10 and 20 remains constant. There is a strand making assembly 66 that creates and applies the strands between the exposed surfaces of the webs 10 and 20. A pull conveyor assembly 69 is located before and after the strand making assembly 66. This portion of the process is indicated by box 53 in FIG. 4. The webs are pulled over rollers 67 and 68 by the first pull conveyor assembly. Then the webs pass through the strand making assembly 66 and over the second pull conveyor assembly. The webs are fed through the machine in a manner so as to be under a very minimum amount of tension when the strands are applied. As the material leaves the second pull conveyor the structure would look like what is shown below arrow 2 in FIG. 1. The rollers 63 are preferably load-sensing rollers and provide closed-loop feedback to the two pull conveyors for controlling the lack of web tension between them. The path of the webs from wheel 68 to the turret 80 on which it is stacked is indicted by broken line 70. The connected webs then travel through a series of accumulator rolls 72 indicated by box 54 in FIG. 4. The connected webs are flipped to accomplish step 55 in FIG. 4 by being passed around wheel 74. Then a second strand making assembly 75 creates and applies swirled strands between the opposite surfaces of the webs 10 and 20 that were exposed when the structure was flipped. This is step 56 in FIG. 4. At this point the material would look like the structure shown in FIG. 1 below arrow 4. The next step, indicated by box 57 in FIG. 4, is to apply glue beads adjacent the bridge of swirled strands. A glue system 76 applies the glue beads immediately after the second bridge of swirled strands is applied. Now the structure looks like that shown in FIG. 1 below arrow 4. Finally, the webs with glue beads are wrapped around the revolving turret 80. Because there are two glue beads on the material being wound on the web, that material bonds to the material on the turret to form a cellular structure similar to that shown in FIG. 2. This is the last step 58 in the diagram of FIG. 4. We prefer to provide an arm 77 that has a wheel 78 at one end. The opposite end is pivotably connected to the frame of the stand holding turret 80. Hydraulic cylinder 79 raises the end of arm 77 so that wheel 78 rests on the connected webs as they go onto the turret 80. The wheel acts as a guide and applies pressure to the webs. The pressure assures that a strong bond will be formed by adhesive beads 33 and 34. When a desired amount of material has been wrapped around the turret, the machine is stopped. Then the stack is cut to remove the curved section at each corner leaving four stacks of cellular product.

The strands 30 may be formed and connected to opposed sections of material by any convenient means. In a preferred dispenser such as elements 66 and 75 in FIG. 3, a curable liquid or thermoplastic is dispensed as a continuous strand. The dispenser has a holding area or well within which the curable liquid is held. There is an opening through which the liquid may be dispensed. Although pressure is applied to dispense the liquid, the opening is preferably located on the bottom of the well so that gravity will assist in causing the curable liquid to exit. One or more air guns direct the strand from the well to the surfaces of the webs 10 and 20. Using air guns permits the manufacturer to control the structure of the web assuring desired spacing between adjacent strands. Preferably, the strand forms a series of overlapping swirls as it is applied to the webs. The curable liquid contacts the webs and bonds to the surfaces of the webs that it contacts. As the liquid is being drawn into a strand, it is being solidified or cured through contact with the ambient air. The air may be cooled or contain catalysts.

Any number of strands may be provided to connect two sections of material. Furthermore, the strands may be at any selected distance apart. The number of strands per inch depends upon a number of considerations, such as production time and the number of swirl guns (the more strands that are used, the longer the structure will take to manufacture unless more swirl guns are used), the appearance of the final product (fewer strands look weaker), and strength (the greater the number of strands, the stronger will be the bond between the two webs of material). In one present preferred embodiment the width of the swirl pattern is ¼ inch (7 mm.) and the opening between adjacent strands is about ⅛ inch (3.5 mm.). That opening should be large enough so that a lift cord can easily pass through the opening. But this is not necessary if the smaller strands are used because those strands could be cut by the cord as it is threaded through the structure. The thickness of each strand may be selectable by increasing or decreasing the opening of the orifice through which the material forming the stands is delivered. This thickness will also depend upon the material chosen, the viscosity of the liquid in the well, and the rate of travel of the strand between the webs. Each strand may be as long or short as is desired. The entire web may be formed of one continuous strand or contain several strands.

The strands may be formed of any suitable material which can be applied in a generally liquid form, strung in a strand and cured, preferably through contact with ambient environment, to a solid flexible strand. Suitable materials include polyester based adhesives such as the type which may be cured through cooling. In the case of a polyester curable by cooling, the well of the applicator may contain a heating unit or the liquid should be otherwise heated so as to be in a liquid state. Other suitable materials to be used as the strand material include polyurethane such as the type which is cured through contact with moisture. In this case, the well of the applicator should maintain a relatively moisture free environment so that the strand material is in a relatively liquid state and may flow freely out of the well. Contact with the ambient air will cool and solidify the strand and contact with the moisture in the air over time would cause the polyurethane to cure and cross-link for additional strength.

With the above mentioned strand materials as well as others, the viscosity of the liquid may be controlled so that when considered in cooperation with the size of the opening a desired flow rate of adhesive out of well can be achieved. For example, in the case of polyester cured by cooling, the higher the temperature maintained in the well, the less viscous is the adhesive within the well and the more freely the adhesive will flow out of well.

Figure 5:
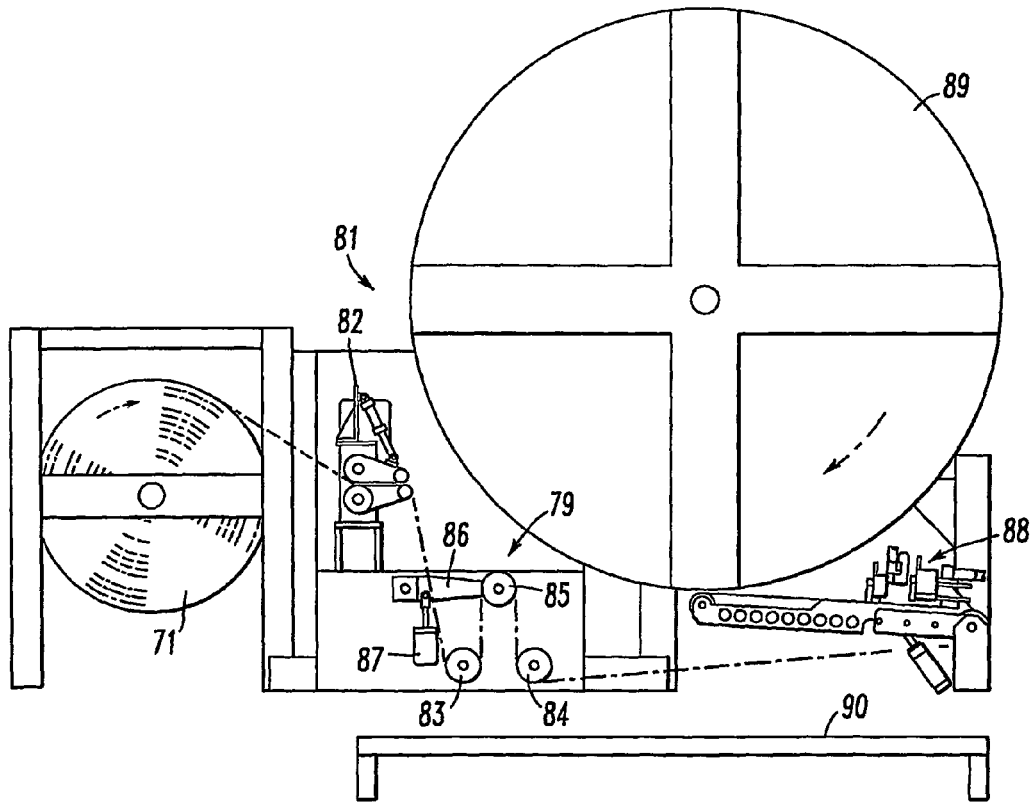
FIG. 5 is a side view of a second present preferred embodiment of our machine for making a collapsible cellular structure.

In a second present preferred machine shown in FIG. 5 a supply of tubular material is provided on one or more rolls 71 that typically are about four feet or 1.2 meters in diameter. The tubular material is directed from the supply roll 71 into the fabricating machine 81. As the material enters the machine 81 it passes over drive mechanism 82 that pulls the material from the roll 71. The material is then directed to an accumulator 79. The accumulator has two fixed wheels or rollers 83 and 84 and a movable wheel or roller 85. This wheel 85 is attached to the end of arm 86. That arm is pivotably attached to the frame. A hydraulic cylinder 87 is provided to move the end of the arm 86 containing wheel 85 up and down. In this manner the length of the path of the tubular material, indicated by chain line, can be lengthened or shortened between wheels 81 and 83. A glue system 88 applies the glue beads to the tubular material just prior to the material being wound on wheel 89. Because there is at least one glue bead on the material being wound on the wheel, the overlapping surfaces are bonded together at the glue line as the material is wrapped onto the wheel to form a cellular structure. The glue bead or beads can be located to produce cells that are symmetrical or non-symmetrical. For example, cells can be made to be D-shaped with the front walls of the cell being larger than the rear walls. When a desired amount of material has been wrapped around the wheel the machine is stopped. Then the stack is cut to remove the cellular structure from the wheel. A table 90 is located near the wheel 89 to provide a flat surface on which at least a portion of the cellular structure is placed after being cut from the wheel. The table may be designed to move below the wheel after the wheel has been stopped to receive the cellular structure after that structure has been cut from the wheel.

Depending upon how much material is placed on the wheel and the speed at which the wheel turns, twenty minutes to over an hour may pass from the time the tubular material receives the glue bead until the stack is placed onto the table. The adhesive used in the present process takes an initial set as the tubular material is wrapped onto the wheel. However, the final set does not occur until after the stack has been placed upon the table. When the stack is first placed on the table the adhesive may creep allowing the cells in the stack to flatten. If desired a weight could be placed on top of the stack to encourage or accelerate the adhesive creep and flattening of the cells.

We prefer that the wheel have a diameter of at least 33 feet or about 10 meters. A wheel 33 feet in diameter will produce a cellular structure of nearly 104 feet in length if cut from the wheel using a single cut. Therefore, an operator may wish to make two or more cuts in the cellular structure while it is on the wheel to produce smaller lengths that are easier to handle. Somewhat smaller diameter wheels could be used for some materials. However, wheels having a diameter of less than 15 feet are likely to place so much curvature in the cells as they are being formed on the wheel that the fabric will wrinkle when placed on the flat surface rather than assume a clean straight shape. If desired the wheel could have flat surfaces around its circumference on which the tubular material is wrapped. Such a wheel may appear to be elliptical rather than circular. However, the ratio of the major diameter to the minor diameter of such a wheel should not be more than two. A present preferred wheel having four flat surfaces is shown in FIG. 3.

Figure 6:
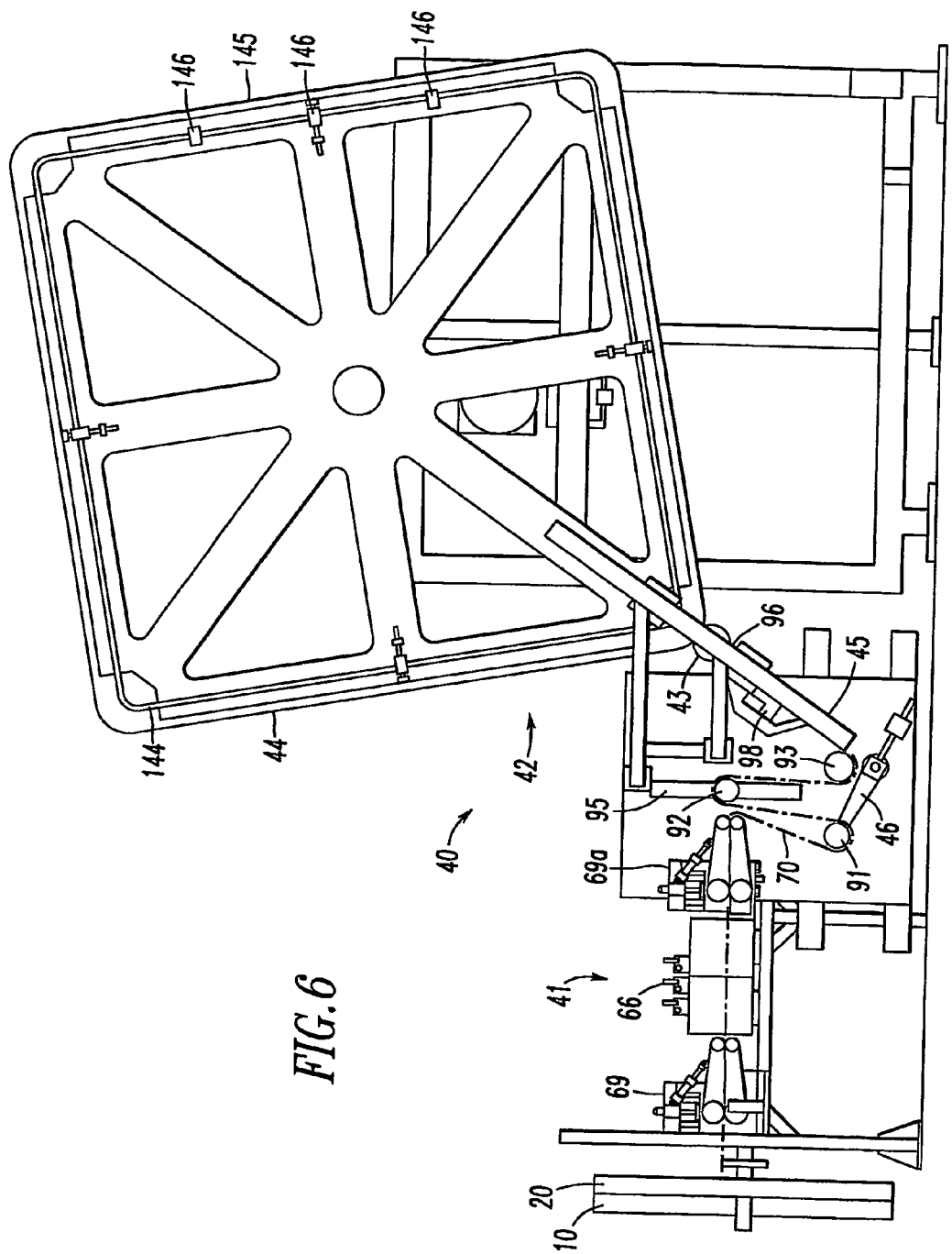
FIG. 6 is a side view of a third present preferred embodiment of our machine for making a collapsible cellular structure.
Figure 7:
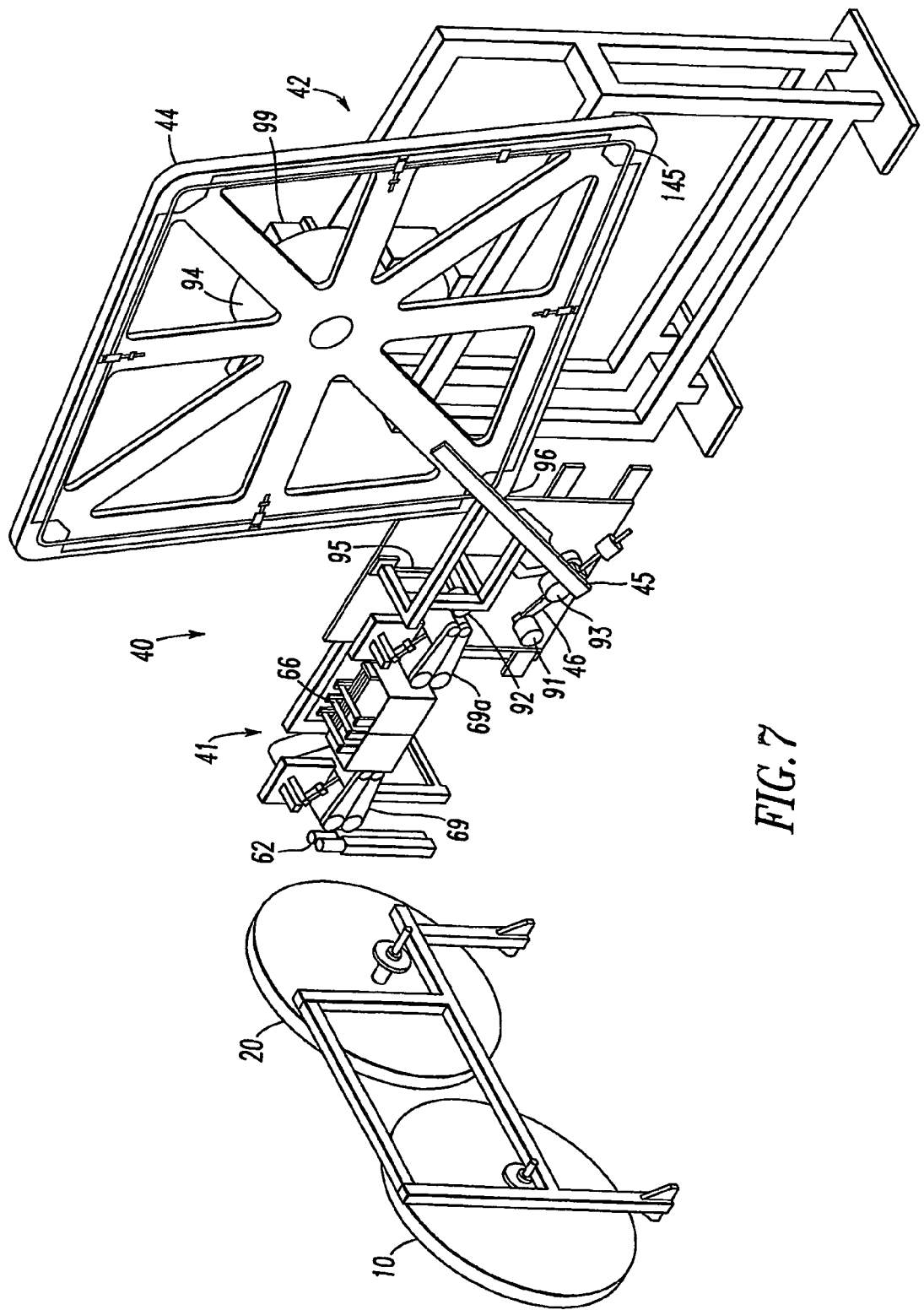
FIG. 7 is a perspective view of the machine shown in FIG. 6.

A third present preferred embodiment of our machine is shown in FIGS. 6 and 7. This machine 40 has a first section 41 in which the tubular structure is formed from rolls of fabric 10 and 20 and a second section 42 in which the tubular structure is wound onto a collector. The first section is comparable to the portion of the machine shown in FIG. 3 that forms the tubular structure. The strips of fabric are turned and folded at guide 62 into a V-shape as they enter pull conveyor 69. They pass under strand making assembly 66 where the tubes are formed and go onto the second pull conveyor 69a. The tubular structure follows path 70 shown in dotted line around wheels 91, 92 and 93 to the lay-on wheel assembly carried on sliding arm 45 which runs on track 96. The lay-on wheel assembly has a glue applicator 98 that applies the glue to the tubular structure and then directs the tubular structure onto the collector wheel 44. The collector wheel 44 has four flat sides connected by curved corners.

The tubular structure is applied to the collector by a lay-on wheel 43 attached to a sliding arm 45. This arm can move toward and away from the collector to accommodate the changing diameter of the turning wheel. A spring (not shown) keeps the lay-on wheel 43 on the collector wheel 44. The tubular structure always meets the collector wheel at a 90° angle. Consequently, the pressure applied by the lay-one wheel 43 to press the tubular structure against material on the collector is substantially the same throughout the revolution of the collector. Accordingly, the glue bead between adjacent structures should be uniform in width. A track 144 is provided on the collector wheel. A pin (not shown) connected to sliding arm 45 rides in the track and keeps the sliding arm 45 and lay-on wheel 43 aligned with the collector wheel 44. Arm 46 can move wheel 91 and wheel 92 is movable in track 95 to provide an accumulator or dancer. The dancer enables the speed of the webs to remain constant through the first portion 41 of the machine. We also provide a variable speed motor 94 to turn the collector wheel. Sensors could monitor the position of the collector wheel 44 and the speed of the tubular material moving through the machine. Information from these sensors could then be processed by a controller 99 that signals the motor 94 to change speed. Rather than rely upon sensors, we prefer to provide a master drive. The master drive is connected to the motors in pull conveyors 69 and 69a that drive the webs through the tube forming steps and to the motor that drives the wheel collector 44. This connection could be mechanical but preferably is electronic. Consequently, the speed of the machine can be increased or decreased by changing the speed of the master drive. The motor 94 which turns the collector wheel is controlled by a controller 99 containing software which changes the rotational speed of the collector wheel to accommodate the change in diameter of the wheel. The machine can operate at speeds in which the webs and tubular structure travel at from 200 to 500 feet per minute.

The rim 145 of the collector wheel 44 is not a flat surface but is curved in both the longitudinal and transverse directions. The longitudinal curvature is preferably a change of one inch per 104 inches. In a preferred embodiment of the collector the flat portions of the rim are flexible. Screws 146 are provided for each flat segment which enable the center of the segment to be moved up or down. In this way, a concave or convex curvature can be created. The transverse curvature could be concave if a single glue line is applied to the tubular structure because the stack on the collector wheel would be thicker in the center. If multiple glue lines are applied to the tubular material, then the center of the stack will have less material. In this situation a convex transverse curvature is provided on the rim. Another option is to provide pins on the rim of the wheel that simulate a curved surface.

While certain present preferred embodiments have been shown and described, it is distinctly understood that the invention is not limited thereto but may be otherwise embodied within the scope of the following claims.

We claim:

1. A machine for making cellular products comprised of:
   a supply containing at least two rolls of fabric web;
   a web folder connected to the supply which receives two fabric webs and folds each web to a V-shaped or a C-shape;
   a strand making assembly connected to the web folder which receives the folded fabric webs and applies strands between the two fabric webs connecting the webs together;
   a glue system connected to the strand making assembly which applies at least one glue line to the fabric webs; and
   a collector wheel which receives the interconnected fabric webs as successive turns or wraps of interconnected fabric webs, successive turns or wraps being adhered to former turns or wraps along the at least one glue line.

2. The machine of claim 1 wherein the collector wheel has a plurality of straight surfaces on which the fabric webs are wrapped.

3. The machine of claim 2 wherein the straight surfaces are concave, convex or flat in a transverse direction.

4. A machine for making cellular products comprised of:
   a supply containing at least two rolls of fabric web;
   a web folder connected to the supply which receives two fabric webs and folds each web to a V-shaped or a C-shape;
   a strand making assembly connected to the web folder which receives the folded fabric webs and applies strands between the two fabric webs connecting the webs together;
   a glue system connected to the strand making assembly which applies at least one glue line to the fabric webs; and
   a collector wheel which receives the fabric webs, is connected to the glue system and has a plurality of straight surfaces on which the fabric webs are wrapped; and
   adjusters connected to each straight surface which can be operated to change curvature of the straight surfaces in the transverse direction.

5. The machine of claim 1 also comprising a slitter connected to the web folder.

6. A machine for making cellular products comprised of:
   a supply containing at least two rolls of fabric web;
   a web folder connected to the supply which receives two fabric webs and folds each web to a V-shaped or a C-shape;
   a strand making assembly connected to the web folder which receives the folded fabric webs and applies strands between the two fabric webs connecting the webs together;
   a glue system connected to the strand making assembly which applies at least one glue line to the fabric webs; and
   a collector wheel which receives the fabric webs and is connected to the glue system; and
   a lay-on wheel assembly positioned adjacent the collector wheel, the lay-on wheel assembly comprised of a lay-on wheel on a movable arm over which the fabric webs pass, the arm configured to move toward and away from the collector wheel.

7. The machine of claim 6 also comprising a glue applicator connected to the arm.

8. The machine of claim 6 also comprising an accumulator connected to the arm.

9. The machine of claim 1 also comprising:
   a variable speed motor connected to and driving the collector wheel;
   a sensor adjacent the glue applicator that senses a speed at which the fabric passes under the glue applicator and generates signals corresponding to sensed speeds; and
   a controller connected to the sensor and the variable speed motor which directs the variable speed motor to change speeds in response to signals from the sensor.

10. The machine of claim 9 also comprising a first fabric drive positioned before the glue applicator and a second fabric drive positioned after the glue applicator, the fabric drives controlled so that fabric passes under the glue applicator at a selected constant speed with little or no tension.

11. The machine of claim 9 also comprising a dancer positioned between the second fabric drive and the collector wheel.

12. The machine of claim 9 also comprising a dancer positioned between the supply of fabric and the first fabric drive.

* * * * *